INVENTOR.
J. H. BURNETT

April 14, 1964     J. H. BURNETT     3,129,368
SMOOTH CONTROL OF POLYPHASE INDUCTION MOTORS
Filed April 4, 1960     3 Sheets-Sheet 2

INVENTOR.
J. H. BURNETT
BY
HIS ATTORNEY

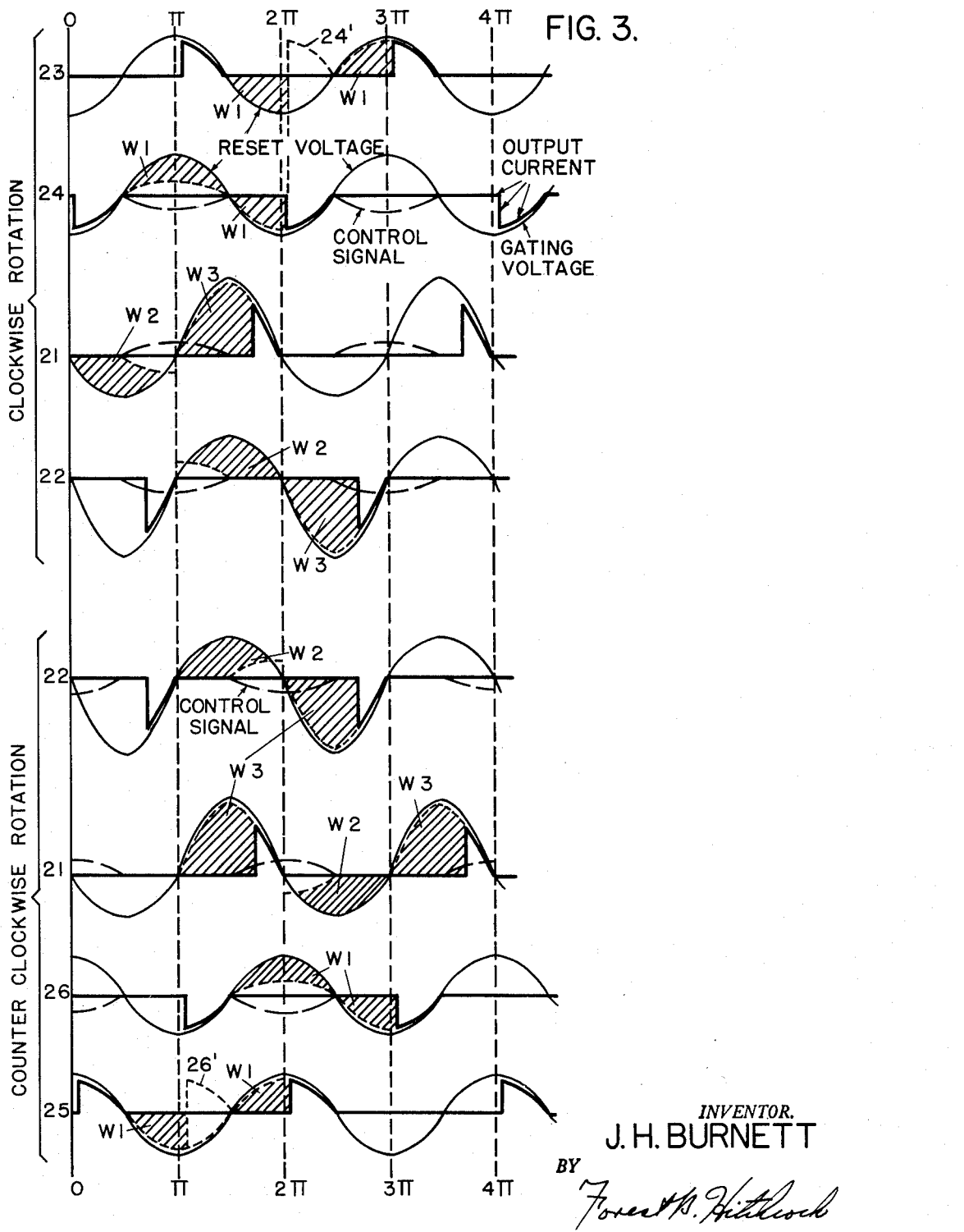

United States Patent Office 3,129,368
Patented Apr. 14, 1964

3,129,368
SMOOTH CONTROL OF POLYPHASE
INDUCTION MOTORS
James H. Burnett, Pasadena, Calif., assignor to General
Signal Corporation, a corporation of New York
Filed Apr. 4, 1960, Ser. No. 19,544
5 Claims. (Cl. 318—227)

This invention relates to smooth or stepless speed control of polyphase induction motors using suitable magnetic amplifiers and recetifiers for such control in each phase of the motor windings.

This scheme may be considered an improvement in the system of application Ser. No. 794,342, now U.S. Patent No. 2,960,644, entitled "Thyratron Control of A.C. Motors" since it includes but a single channeled amplifier (may be more than one amplifying device depending on the sensitivity required) to provide the control means for the magnetic amplifiers which, in turn, control the rectifiers in series with the motor phases. Since merely a single amplifier is involved it simplifies the set up procedure for balancing the phases, however, proper design measures must be taken within the magnetic amplifier units so that the end result will produce approximately equal currents in all phases of the motor. This arrangement possesses another advantage by eliminating unequal aging affects in the amplifying devices whenever more than one are used. It could well be said that this embodiment retains all of the advantages which the previous system possesses and still retains an additional economic advantage by the elimination of multiple components in the amplification segment of the system.

The drawings herein shown pertain to a particular embodiment of my invention showing a two phase motor which is controlled by groups of solid state gatable rectifying devices which, in turn, are controlled by individual magnetic amplifiers of the resettable and voltage controlled type. A similar magnetic amplifier was described in the Proceedings of the Institute of Radio Engineers, vol. 44, No. 4, April 1956, pages 529 to 532, the title of which was "A Magnetic Thyratron Grid Control Circuit." Each of these magnetic amplifiers is properly gated or synchronized so that it will control full wave rectifiers thereby regulating the currents through each phase of the motor windings. It is hoped that the particular embodiment illustrated and referred to throughout this specification will aid the reader in understanding this invention, but it should be borne in mind that such simplification of illustration or explanation is not intended to limit the scope of my invention in any manner.

The main object of this invention is to provide a motor control system using a single channel amplifier to avoid undesirable and complicated set-up procedures.

Another object of this invention is to use the more reliable solid state rectifying devices rather than evacuated electron tubes, the former being relatively shock proof thereby making this overall assembly more suitable to applications where shock hazards are encountered.

In FIG. 1 a general block diagram of the apparatus used is shown.

FIG. 3 shows typical waveforms which result when the circuti of FIG. 2 is in operation.

The special apparatus used in the embodiment of this invention is a four section transistor which possesses thyratron-like characteristics. The general literature describes the manufacture and performance of these transistors which I belive I have applied to a unique circuit for controlling induction motor currents. The induction motor 15 is preferably a two phase low inertia type similar to that shown and described in U.S. Patent No. 2,438,872.

The general method of operation, either for positioning such an above mentioned servo motor or for controlling its speed, embodies a feedback generated voltage from the motor being controlled to regulate the transistor amplifier and the magnetic amplifiers which, in turn, control the rectifiers supplying the motor phase currents. This scheme is particularly advantageous for two phase motor operation since it avoids heat and hysteresis losses in the main phase and thereby increases the efficiency of two phase motor operation. In a positioning system under conditions during which the motor must remain at standstill "single phasing" is avoided because the main phase has no current flowing through its winding.

Figure 1:
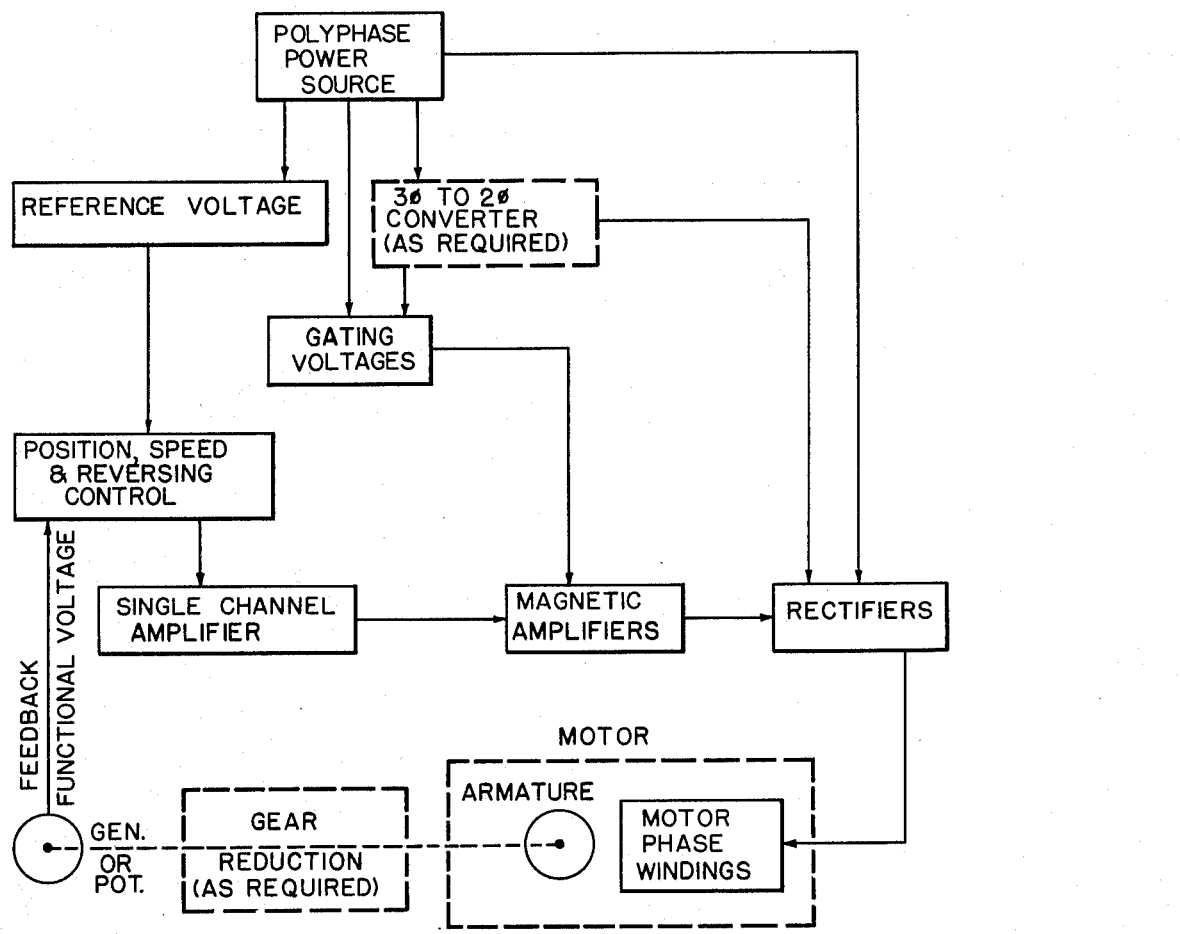

In FIG. 1 is shown a polyphase source of power which supplies the motor windings through groups of rectifiers. This is also the source for any gating voltages or any reference voltages which may be required. In the case of a two phase system a converter such as the conventional Scott or T transformation, for example, is required between the power source and the rectifiers and gating voltages since most two phase systems are generally operated from a three phase power supply. The speed and reversing control voltage is developed from the addition of a reference voltage to a feedback voltage supplied by a generator attached to the motor shaft. Any amplifier of whatever sensitivity may be required is used to amplify this control voltage so that its output is capable of controlling the magnetic amplifiers over their full range of operation. These magnetic amplifiers are inserted in pairs in each phase supplying the motor winding so that each pair is capable of providing full wave currents for controlling the rectifiers inserted in series with each motor phase.

Furthermore, these magnetic amplifiers are capable of providing stepless or smooth control throughout their full range so that the resulting motor operation is smooth acting. The rectifiers must be capable of handling the full phase currents supplied to the motor 15 and when proper polarity and amplitude is supplied to their gates from the magnetic amplifiers they must be completely cut off under conditions when the motor 15 is at standstill. The magnetic amplifiers are synchronized in phase relationship by a gating voltage in such a manner so that their control influences the rectifiers in the main phase and one winding of the control phase for one direction of rotation of the motor, and for the other direction of rotation they influence the rectifiers in the main phase and the opposite control phase of the motor. For either positioning or speed control maximum full wave currents are available within one cycle of the supply frequency for nearly instantaneous control of the motor 15. It must be remembered, however, that the inertia of the system impedes instantaneous response even though the correcting voltage may be available almost instantaneously. Where speed control is an important factor and load changes are constantly occurring the system will automatically correct for the load variations and attempt to keep the motor running at a constant speed. Another possible use to which this system may be put to advantage is for programming the speed or position of any polyphase induction motor.

Figure 2:
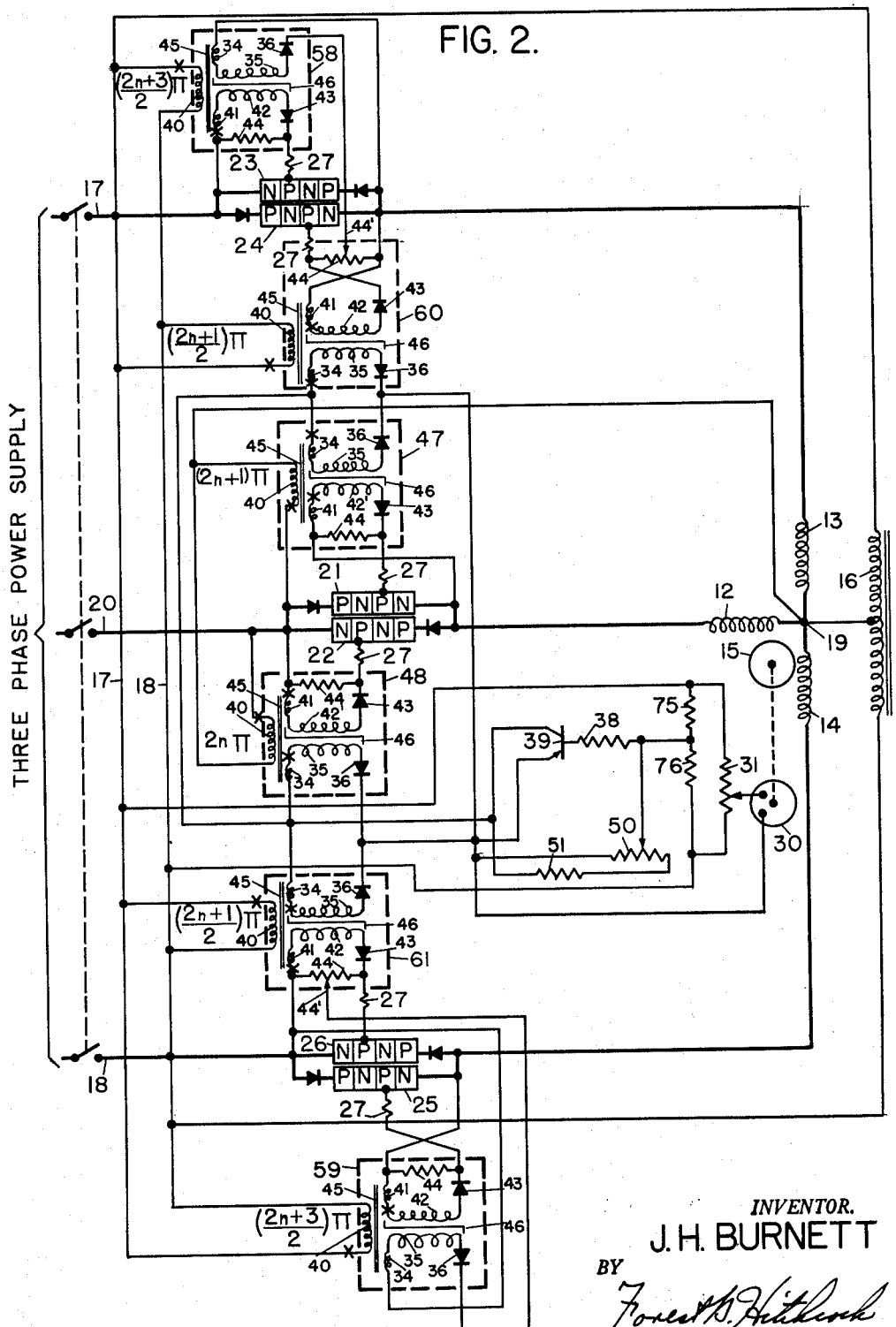
FIG. 2 illustrates in detail the circuit connections for the arrangement embodied in FIG. 1.

Referring to FIG. 2, lines 17, 18 and 20 represent the three wires of the three phase power supply input. Each of these wires are connected to a pair of gatable PNPN transistors which control the amount of current flowing through these wires to each of the motor phase windings 12, 13 and 14 which are connected as a load on the other side of the transistor pairs. For clarification this power circuit leading to the motor windings has been emphasized. The usual Scott or T connection for transforming the three phase voltage to two phase voltage is accomplished by the center tapped autotransformer 16 whose output terminals are shown connected across one phase of the power supply and whose center tap is returned to the junction point of all three windings of the motor at point 19. It will be noted that diodes are also inserted in series with each PNPN transistor with the polarity such that current flows into the P end sandwich of the transistor. These prevent the possibility of high reversed polarity voltages from damaging the PNPN devices. Thus, a controllable two phase power supply is provided which is smooth acting over its complete range.

Each PNPN transistor 21–26 inclusive is capable of carrying the full motor phase currents for reasonable horsepower limits of motor power. The transistors 21 and 22 are gated to govern the current through the main phase winding 12 whereas the transistors 23 and 24, are gated to govern the current through the control phase winding 13 for one direction of rotation, and the transistors 25 and 26 are gated to govern the current through the control phase winding 14 for the other direction of rotation. In one direction of rotation, the transistors 25 and 26 are cut off, and in the other direction of rotation, the transistors 23 and 24 are cut off.

Magnetic amplifiers 47 and 48 control the gating of transistors 21 and 22 respectively by the development of a voltage across their output load resistors 44. One side of this output voltage is applied through a current limiting resistor 27 to the gatable terminal P of each PNPN transistor and the other side is applied to the cathode terminal N of the transistor. This voltage is effective to control conduction through the PNPN transistor when it is of sufficient magnitude to be equivalent to what is generally known as the avalanche voltage. When dealing with pulse voltages as in this embodiment, it is essential for conduction that this avalanche voltage be synchronized with a positive-going voltage applied between the anode and cathode terminals of the PNPN transistor.

In a similar manner, magnetic amplifiers 58 and 60 control the gatable transistors 23 and 24 respectively, and magnetic amplifiers 59 and 61 control the transistors 25 and 26. The magnetic amplifiers 60 and 61 each have a tap connection 44' to their output resistor 44 to supply an input voltage to amplifiers 58 and 59.

The avalanche voltage is developed across the output resistors 44 in the magnetic amplifiers by a current flowing through secondary windings 41 and 42, and diode 43 of each magnetic amplifier in a direction as determined by the polar orientation of the diodes 43 so that current will flow around the secondary loop toward the P gating terminal of each transistor. It should be noted that secondary windings 42' have twice the number of turns as the secondaries 42, the purpose of which will be explained hereinafter.

The voltage source for this secondary circuit comes from two places, the secondary 41 of the synchronizing transformer 45, and the secondary 42 of the saturable transformer 46. The former of these induced voltages will now be discussed and later the latter will be considered.

The voltage induced in the secondary 41 is derived by the voltages applied across its primary 40, which is in phase or out of phase by 180° with this primary voltage. It will be noted that each of the primaries of the synchronizing transformers 45 have a voltage applied having a phase as marked across the primary of this synchronizing transformer in FIG. 2. This phasing corresponds to the current conductive period of the waveforms of FIG. 3 which will be discussed hereinafter. In discussing this phase relationship, the polarity of the windings involved must also be considered, therefore an "*x*" is marked on the high polarity side of the transformer windings with regard to some time instant. For example, time pi corresponds to that of the marking on the input to the synchronizing transformer 45 of the magnetic amplifier 47 when $n$ equals 0.

It may be noted that the high side of the primary winding 40, referred to at "*x*," of magnetic amplifier 47 is connected to wire 20, so we will assume at time pi that the voltage on this wire is beginning to go positive. The low side of this primary winding 40 is connected to the other side of the main phase or junction 19. In the secondary circuit of the magnetic amplifier 47 the high side of the secondary winding 41 is also referred to at "*x*"; this connection now being effective to cause clockwise current flow around the secondary loop of the magnetic amplifier 47 in a direction so that diode 43 will conduct. This will establish a voltage across the load resistor 44 and this, in turn, will bias gate P of transistor 21 positively and thereby prepare for conduction to occur. Inasmuch as wire 20 has a positive-going potential at this time, the anode terminal P of transistor 21 is being supplied by a positive-going potential with respect to its cathode, consequently, all conditions for conduction through transistor 21 are now met. The high potential side of winding 40 of magnetic amplifier 48 is connected to wire 20, since it likewise is positive-going at time pi, and inasmuch as the high potential side of secondary winding 41 of this synchronizing transformer 45 is also connected to this same point, then clockwise current flow around the secondary loop of magnetic amplifier 48, caused by this developed secondary potential, will be blocked by the polar orientation of the diode 43. As a result no potential will be developed across the load resistor 44, hence no gating voltage will be applied to the gate P of transistor 22. Furthermore the anode-cathode potential for the diode 22 is reversed at time pi, so it is further prevented from conducting.

During the next half cycle when $n=1$, the conditions are reversed and wire 20 is of a negative polarity. Under these conditions the primary 40 and the secondary 41 at "*x*" and the cathode terminal of transistor 22 are of a negative polarity. This causes a counterclockwise flow of current in the secondary circuit of the magnetic amplifier 48 to provide a positive potential to the gate P of this transistor 22. At this time the anode terminal of the transistor 22 is being driven positive because it is connected to the opposite or positive polarity terminal 19 through winding 12 of the motor 15. At this instant there is no voltage drop across winding 12, because at the start of the half cycle, as terminal 19 is going positive, the anode P of transistor 22 is also going positive. Thus the anti-parallel combination of transistors 21 and 22 are conducting on each alternate half cycle in opposite directions to supply motor winding 12 with a complete cycle of controlled A.C. current.

In a similar manner the winding 13 will receive both positive and negative pulses of current during alternate half cycle periods by the gating of the transistors 23 and 24. These gates are controlled respectively by the magnetic amplifiers 58 and 60 which, in turn, are synchronized by their own respective synchronizing transformers 45. In this case the primary windings 40 of these synchronizing transformers are connected across wires 17 and 18 which are out of phase with the main phase by 90°. When the current through winding 13 is phased 90° lagging that in the main winding 12, one direction of rotation of the two phase motor will result. On the other hand, when the current through winding 14 is phased 90° leading that in the main winding 12, the other direction of rotation will occur.

Th winding 14 will be receiving no current during the time that winding 13 is conducting for it will be cut-off by the transistors 25 and 26. When wire 17 is positive-going, as originally established, wire 18 is negative-going. Under this condition the cathode terminal of transistor 26 is connected to this negative-going potential, for the primary circuit of the magnetic amplifier 61 is receiving a signal from the output of the amplifier 39 in phase with the voltage across the winding 34 of this magnetic amplifier. This means that these two voltages are additive and hence place the state of the saturable core of transformer 46 to a most negative condition. It will be noted that the secondary 34 of magnetic amplifier 60 is in opposition to this and hence subtracts from the control signal voltage, thereby causing this magnetic amplifier to have some output. Contrawise, the secondary circuit of magnetic amplifier 61 at this time will have no output because the saturable core maintains a high flux in the negative direction because of the high additive negative voltages which are applied across its primary circuit. Thus, the gating of transistor 26 cannot occur. Now that no output results across the tap 44' of magnetic amplifier 61 the magnetic amplifier 59 will not receive any input. This magnetic amplifier is designed so that its output is proportional to its input signal. This input is used to overcome the magnetic flux condition of the saturable core of transformer 46 in magnetic amplifier 59, but now that none exists, it will also remain in its negative flux state, hence no output will occur in its secondary circuit to gate transistor 25.

In the secondary circuits of the magnetic amplifiers the second source of voltage is that which is stored in the cores of the saturable transformers 46. This storage is accomplished by changing the state of the core from a saturated condition to an unsaturated condition. The flux as it changes with respect to time develops a voltage characterized by the well-known relation $d\phi/dt$, or stating it another way, the flux is equal to the volt-time integral of the applied waveform. The unsaturated condition of the core may be more accurately thought of as a negative flux condition having stored energy equal to the amount of flux or volt-seconds which were required to place it into this condition. These units of flux are ofttimes called "webers." Since some quantity of webers are stored in the core material during a previous half cycle, this energy must be first overcome before conduction can occur. In other words, the quantity of webers stored in the core must be balanced by the same quantity of webers during the first portion of the following half cycle, after which conduction will follow. During the fore part of the conduction half cycle, then, the winding 41 is overcoming the volt-time or weber storage in transformer 46. Suddenly when saturation is reached the winding 42 impedance substantially becomes zero and acts as a short circuit, consequently, a voltage across winding 41 causes a current flow in the secondary circuit of the magnetic amplifier. When this current is applied across the load resistor 44 a voltage of this same wave shape is developed across the resistor. This trailing end of the sine wave pulse is effecvtive to trigger the PNPN transistors into a conductive state when they are concurrently receiving the proper anode-cathode voltage.

The primary circuits of the magnetic amplifiers comprise a secondary winding 34 on the synchronizing transformer 45, a primary winding 35 of the saturable transformer 46, and a diode 36. Four of these primary circuits of the magnetic amplifiers 47, 48, 60, and 61 are connected in parallel across the output of an amplifier 39. The other two primary circuits receive their input voltage across a portion of the resistors 44 within the magnetic amplifiers 60 and 61. The tap 44' on these output resistors 44 is provided so that some portion of their respective outputs may be amplified by the magnetic amplifiers 58 and 59. The secondary winding 34 provides energy during alternate half cycle periods, because of the diode 36 within the same circuit, to reset the magnetic cores of the saturable transformer 46. The high side of this secondary is marked with an "x" just as was the primary and the other secondary windings of this transformer 45. This resetting must occur during the half-cycle intervals between the alternate half cycles during which conduction takes place on the secondary side. Therefore, the diodes 36 restrict the current flow caused by the induced voltage in winding 34 to these half cycle periods which are out of phase to the primary by 180°. Two of these primary circuits 47 and 48 are phased 180° apart, consequently, half cycle pulses from these two are occurring in the same direction over a complete cycle. The other two secondary windings 35 within the magnetic amplifiers 60 and 61 are also phased 180° from each other and 90° from those of 47 and 48, consequently, a half cycle difference exists between the half wave voltage pulses from these two primaries which add to the former two pulses to provide a ripple voltage across the emitter-collector terminals of the transistor 39. This ripple voltage turns out to have frequency of 240 cycles per second because two of the half cycle pulses are phased 90° respectively from the other two. The self inductances within the primary circuits of the magnetic amplifiers are doubly effevctive at this frequency than they would be at a frequency of 120 cycles per second, for example, to smooth out this ripple voltage to some extent. For all practical purposes, then, the transistor 39 collector is subjected to a negative D.C. voltage with respect to its emitter.

The transistor 39 has its base connected through a resistor 38 to the junction of resistors 75 and 76. This same point is connected to the variable arm on the potentiometer 50. One side of this potentiometer 50 is connected to the emitter of the transistor 39 and the other side is connected through resistor 51 to its own collector terminal. By this arrangement a voltage divider is formed so that the base may reside at some potential more negative than its own emitter, preferably at a point well above cut-off so that transistor 39 will normally be conductive.

One side of the output from tachometer generator 30 is connected to the emitter terminal of the transistor 39 and the other side is connected to the variable arm of a potentiometer 31 whose extremities are connected across the resistors 75 and 76 in series, thereby forming a bridge circuit. By this arrangement the output from the tachometer generator 30 is connected in series with the output of the bridge circuit which includes the terminals of the movable arm of potentiometer 31 and the junction of resistors 75 and 76. Since the resistor 38 is primarily a current limiting resistor, the voltages developed across the tachometer 30 and the output of the bridge are connected in series with the input of the transistor 39, for the combined voltage developed across these two circuits appears between the emitter and base terminals. Whenever the sum of these two voltages goes less negative, this lower negative input voltage to the transistor 39 will tend to drive it nearer to cut-off. The input terminals of this bridge circuit (the extremities of the potentiometer 31) are connected to a reference voltage across buses 17 and 18. Resistors 75 and 76 are of equal value to provide equal arms on one side of this bridge circuit and the two portions of potentiometer 31 form the other two arms of the bridge circuit. Thus, it can be seen that when the movable arm of the potentiometer 31 is at the electrical midpoint, the bridge circuit is balanced, and therefore no output voltage is present across its output terminals.

The output of the transistor 39 from its emitter to collector terminals is connected across four primary circuits of magnetic amplifiers 47, 48, 60, and 61 in parallel. Because of the rectifying action of the diodes 36 in each of these parallel circuits only half cycle pulses of output voltages will be effective to control these primary circuits. It will be noted that two of these magnetic amplifiers 60 and 61 are synchronized from the same buses 17 and 18 from which the reference voltage connected to the bridge circuit was taken. Thus, one of these magnetic amplifiers, for example 60, and particularly the secondary winding 34 is in phase with the amplified control signal voltage, whereas the other secondary winding 34 of magnetic amplifier 61 at this time is 180° out of phase.

The voltage appearing across the output of the bridge circuit must be in opposition to that from the tachometer generator 30 so that the feedback supplied from this device and the bridge circuit are degenerative. In other words, these two voltages must be phased 180° apart so that they will subtract. The difference between these two voltages must be a negative voltage which will tend to energize the base of transistor 39 closer to cut-off as it becomes less negative. This can be readily arranged by making the voltage having the greater magnitude a negative-going voltage and the lesser voltage a positive-going voltage, so that the difference voltage will retain a negative polarity. On the output side of transistor 39 the amplified voltage will be shifted by 180° from the input control voltage. In some instances this control signal is shown in FIG. 3 as a positive voltage and in other instances it is shown as a negative voltage, for it depends upon the synchronizing voltage with which it is associated at the time. In one instance, it is shown as a negative-going voltage as represented by curve 55 in line 24 of FIG. 3. It will be noted that only a half cycle of this amplified control signal is effective because of the diode 36 in the primary circuit of the magnetic amplifier. The synchronizing voltage 56 must be in opposition to this control signal so that the control signal 55 will subtract from it. Thus, the orientation of the winding 34 of FIG. 2 within the magnetic amplifier 60 is predetermined by this 180° phase displacement and the control signal polarity is reversed with respect to this synchronizing voltage. The difference between the voltage 55 and 56 of FIG. 3 results in a voltage whose ordinate lies between the curves 56 and 57, consequently, this voltage is effective during the half cycle to develop the area indicated as W1.

The connections for the synchronization of magnetic amplifiers 47 and 48 are arranged in mutual 180° phase relationship, but one of these, namely 48, is leading the control phase associated with magnetic amplifier 60 by 90°, whereas magnetic amplifier 48 is synchronized lagging this control phase by 90°. The synchronizing voltage for these magnetic amplifiers is obtained by connecting the primary winding 40 of the transformer 45 across the quadrature supply voltage between wire 20 and junction 19. Since the control signal is also applied across the primary of magnetic amplifiers 47 and 48, it will be out of phase with their synchronizing voltage by 90°. This condition is clearly shown in the waveforms of lines 21 and 22 of FIG. 3.

If the motor 15 is at standstill no output will be developed across the output terminals of the tachometer generator 30, consequently, no bias voltage will be supplied to the base of transistor 39 from this source. As previously stated when the bridge is balanced, it likewise adds no bias voltage to the base of transistor 39, therefore under these conditions this transistor will be biased only by the setting of the potentiometer arm 50. In this embodiment the potentiometer arm 50 is set so that a high negative bias is applied to the base of transistor 39 so that it is normally in a state of maximum conduction. This corresponds to a low output voltage from transistor 39, for it is substantially short circuited under these conditions of maximum output current. Since transistor 39 adds substantially nothing in the way of output voltage, substantially all of the voltage used to reset the core of the saturable transformer 46 is derived from the secondary 34 of the synchronizing transformer 45. This secondary voltage establishes the maximum quantity of webers within the primary winding 35 of the saturable transformer 46 so that during the half cycle reset time the core is saturated most negatively. To overcome such a high reset quantity of webers the next half cycle must drive the core positively by at least the same quantity of webers before conduction will take place, consequently, when the maximum number of webers are reset within the previous half cycle, the following half cycle will not allow any current flow until such reset quantity of webers is cancelled.

By setting the potentiometer 31 to a off-center position unbalances the bridge circuit and produces a voltage across the output terminals of the bridge. This voltage becomes amplified by the transistor 39 to reset the saturable core of the transformer 46 of the magnetic amplifiers which, in turn, trigger the PNPN transistors to operate the motor. The turning of the motor 15 provides an output voltage from the tachometer generator 30, since it is mechanically connected to it, and this output voltage, in turn, subtracts from the voltage developed across the output terminals of the bridge. Thus, at some particular setting of the potentiometer 31 a stabilized difference voltage is established which is applied between the emitter and base of the transistor 39 thereby driving it to a condition of lesser conduction than its normally high conducting state. Because of this lower conduction from the transistor 39 a small voltage will appear across its output since it is now somewhat removed from its substantially short-circuited condition. The connections in the circuit are arranged so that this small developed voltage will subtract from the voltage produced in the secondary 34, therefore throughout the reset half cycle a lesser quantity of webers will be developed under the voltage waveforms. This effect may be seen by referring to line 24 of FIG. 3 wherein the voltage 55 developed by the control signal subtracts from the reset voltage 56 to produce a net voltage which is representative of the ordinate between the shaded curves 56 and 57 marked in this figure as W1.

When some quantity of webers less than the area produced by the reset voltage curve during a half cycle occurs in the system, the secondary side of the magnetic amplifier will begin to conduct at some point toward the trailing end of the next successive half cycle period. The point at which conduction starts will depend upon the number of webers equivalent to W1 in the opposite polarity to the reset quantity of webers. At the point where the W1 areas are equal complete saturation of the core will occur and from this point conduction will take place within the secondary circuit. This conduction will develop a voltage across the output load resistor 44 which, in turn, is effective to gate the respective PNPN transistor connected to it. Thus, the motor windings 12 and 13, for example, will receive energy when the pair of transistors 21 and 22 are gated along with the 23 and 24 pair of transistors respectively. This will cause the motor to rotate in a clockwise direction, for example, as indicated by the four waveforms 23, 24, 21, and 22 of FIG. 3 and such clockwise rotation of the motor will develop a voltage output from the tachometer generator 30 as a result of its rotation.

The speed of the motor will stabilize at any particular setting of the potentiometer arm 30 and any tendency to slow down the motor by an additional load will cause a lower output voltage from the tachometer generator 30. Since this decreased output voltage subtracts from the voltage output of the bridge circuit, a higher effective output voltage will be applied to the input circuit of the amplifier 39. The polarity of this increased voltage must be such as to drive the amplifier nearer to cut-off, in this embodiment, more positive. When this occurs a higher output voltage exists across the output circuit of the transistor 39 because its output current drain is reduced. By referring to FIG. 3 line 24 we can see that an increase in output voltage of the control signal (curve 55) will decrease the area W1, consequently in the following half cycle a higher average current will be gated into the motor winding to overcome the increased load on the motor.

In order to obtain a better understanding of the operation of this system let us turn our attention to the waveforms of FIG. 3. It will be noted that the first four waveforms are designated for clockwise operation of the motor and the latter four are designated for counter-clockwise operation. It should be understood that this is an arbitrary representation for in the practical circuit the direction of rotation would depend on the phase relationships in the motor windings themselves. Each of the waveforms shown in this figure has a number associated with it to the left of the 0 reference time mark. This number is the same number as that of the gatable PNPN transistor as indicated in the circuit of FIG. 2. As we progress in time to the right of this waveform the time intervals are designated in multiples of pi since one revolution of the motor or one cycle of any A.C. voltage occurs in a period of 2 pi. The output current developed by the magnetic amplifiers is shown as a heavy solid line and is clearly marked as output current. The gating and reset voltages are shown as normal weighted solid lines but it should be understood that the gating voltage occurs during half cycle periods whereas the reset voltage occurs in alternate half cycle periods between the gating voltage periods. The control signal voltage which is applied to the input of the magnetic amplifiers is shown as a dashed line. It will be noted that this appears as a half wave rectified signal voltage inasmuch as the other half is eliminated by the transistor amplifier itself because of the polarity of the input voltage causing a bias so that it does not conduct during these half cycle intermediate periods. Because of this half wave rectification only half of the control signal voltage is effective to subtract from the reset voltage in the main phase whereas if full wave rectification were used the subtraction area would be doubled. Since this loss of sensitivity occurs only in the main phase, it will be noted that the winding ratio of the magnetic amplifiers in the main phase is doubled with respect to the winding ratios of those in the control phase. It should also be noted that the control signal appears in three of the four waveforms, since as heretofore stated, only three of the magnetic amplifiers which are directly connected to the transistor rectifiers will receive this control voltage. The fourth magnetic amplifier 58 or 59 in either one of the two control phases obtains its input voltage from some portion of the output of the other magnetic amplifier 60 or 61 serving its respective control phase about which further discussion will be continued later. For the present let us continue with the discussion of the control signal voltage. In line 21 of FIG. 3, for one polarity of the main phase current, this control signal must be reversed in polarity with respect to the magnetic amplifier which it is serving so that the same number of webers will be reset in the core as in the waveform of line 22. Although the phase of this control voltage is changed by 180° for counter-clockwise rotation, it will be noted that this same condition prevails for line 21.

Another aspect of all these waveforms is that both the control and main phase are provided with full wave currents which are some trailing portions of any input waveform within any half cycle period. The control phase currents of lines 23 and 24 in the case of clockwise rotation are 90° leading the main phase currents 22 and 21 respectively, whereas the control phase currents in lines 25 and 26 are lagging the main phase currents 21 and 22 respectively by 90°. Whether the motor runs in a clockwise or counter-clockwise direction depends not only upon the error signal but also on the gating voltages which are applied to each of the magnetic amplifiers. In the circuit of FIG. 2 it will be noted that one gating voltage is phased at $2n$ pi and its opposite amplifier is phased at $(2n+1)$pi. The $n$ in this case may represent 0 or any positive integer. These voltages are derived across line 20 and point 19 of the circuit, however, it should be noted that the windings are connected in opposite polarity, thereby providing the 180° phase shift mentioned above. The gating voltages for the control phase are similar with respect to each other but must be either 90° leading or lagging the main phase voltages. In general phasing terminology they then occur at time $$\left(\frac{2n+1}{2}\right) \text{pi}$$

and at $$\left(\frac{2n+3}{2}\right) \text{pi}$$

which likewise senses them in opposite polarity with respect to each other and in proper phase with respect to the main phase. These voltages are obtained from lines 17 and 18 and again it will be noted that each of these two transformer windings are respectively reversed in polarity. If $n$ in all of the above formulas is 0, then the gating voltage applied to transistor 22 will be at time 0, in other words, the current output from this magnetic amplifier must occur starting at for sometime after time 0 and ending at pi time. By turning to FIG. 3 it can be seen that the current output for clockwise rotation occurs during this period or some odd multiple thereof in line 22. Similarly, the current for line 21 appears between pi and 2 pi or some even multiple thereof since its magnetic amplifier is gated at or after time pi. In a similar manner it will be noted that transistor 23 is gated at or after ³⁄₂ pi time and transistor 24 is gated at or after ½ pi time for their respective half cycle periods.

In the preceding paragraph our discussion pertained principally to the period in which the motor phase currents occurred. Now let us concern ourselves with the magnitude of these currents. In line 24 the error signal adds algebraically to the reset voltage in the primary circuit of the magnetic amplifier 60 causing a flux change of W1 webers which is represented by the shaded area enclosed between the reset voltage curve and the negative construction curve of the control signal. After a period of time (during the next succeeding half cycle period) this quantity of webers W1 by becoming dissipated in the core, causes a current to flow which will be gated at a time when this quantity of webers is completely dissipated and continue throughout the duration of this half cycle. Since the control signal is fed into the input of each magnetic amplifier providing for the two opposing currents for the main phase winding, it will be noted in line 22 that the control signal voltage is identical with that in line 24, however, in the input circuit for the magnetic amplifier 47 this control current is sensed in opposition for supplying transistor 21. When this control signal is 0, then in lines 21 and 22 for the main phase it can readily be seen that the number of webers stored in the core during the half cycle period preceding any output current flow is a maximum. At such a time when this condition exists, no output current should result in the secondary side of the magnetic amplifier 47 or 48 which output is represented in the following half cycle period. The design of the system should be arranged so that this condition obtains, otherwise "single-phasing" will result. On the other hand, when the control signal is a maximum, nearly one-half of the area under the reset voltage curve will be subtracted, consequently the area shaded by W2 will be more than one-half of the area beneath this curve, and in the following half cycle since the turns ratio is 1 to 20 instead of 1 to 10 as in the case of the control phase, this area W3 will be doubled that of W2. Since this is one limitation of the error or control signal, it results in W3 area being slightly greater than half of the area under its respective curve. The reason for doubling the gating voltage can now more readily be appreciated since this maximum point in time represents the maximum current which can flow in the main phase winding. This maximum should just about equal the maximum current in the control phase winding which occurs when the control voltage is equal to the reset voltage and hence no area W1 would be developed. Although the control phase currents vary over the entire half cycle period, whereas the main phase currents vary over less than half of their respective half cycle periods, nevertheless the average currents are smooth acting from 0 to maximum and will remain nearly equal throughout the range if proper design precautions are taken.

To complete the picture of the waveforms it might be well to point out that those of lines 23 and 25 receive their input from the voltages developed by the currents in lines 24 and 26 respectively. The number of webers developed on the negative side in waveform 23 for example, is a direct result of the output current waveform in line 24 causing a subtraction of the voltage waveform marked 24' from the reset voltage waveform. It will be noted that this voltage appears at the same time as the current output appears from whence it came, consequently the output current in this waveform will occur in the following half cycle period and will be gated by the number of webers stored in the core, hence it will lag by 180° the current which produced it.

Now if we examine the four latter waveforms marked as counter-clockwise rotation it will be noted that the control signal is again shown in only three of the four waveforms, however, it is now 180° out of phase with respect to that shown for clockwise rotation. The main phase lines 21 and 22 were repeated to show more clearly the manner in which the reset flux W2 was developed. The principle is essentially the same as before and the area developed under the curve will be the same as heretofore.

Now that we have considered all the waveforms of FIG. 3 let us turn our attention to some events which take place when the motor is running for example, in the clockwise direction. If an increased load is applied other than the normal load at some particular speed it will cause the motor to slow down. This reduction in speed will provide a lower output voltage from the tachometer generator which, in turn, will bias the single transistor 39 to a greater degree thereby allowing less current to flow in the output circuit of this transistor. This current in turn produces a greater control voltage which causes a decrease in the area W1 which results in a larger output current from the magnetic amplifier. This increased current tends to return the motor to its preset normal speed even though an additional load has been applied.

One modification for this same general scheme could be used for positioning control. The tachometer voltage is replaced by a voltage proportional to the error of position. Means for deriving such a positional error voltage are well known in the art as disclosed by the system in U.S. Patent No. 1,586,233.

Having described a speed control system for a two phase motor as one specific embodiment of this invention, I desire it to be understood that adaptations, modifications, and alterations may be made to the specific form shown to meet the requirements of practice without in any manner departing from the spirit or scope of this invention.

What I claim is:

1. A control system for operating from a three terminal source of a three phase power supply, a two phase alternating current motor having a main phase winding and two opposed control phase windings with means for deriving from the supply a main phase voltage and a control phase voltage in relative phase quadrature, said motor windings each being fed from the power supply through a respective pair of gatable rectifiers, each said pair of rectifiers being connected in anti-parallel relation to provide a full wave A.C. voltage, said system comprising a pair of resettable magnetic amplifiers for each pair of gatable rectifiers, means connecting the input of each pair of magnetic amplifiers to the phase of the voltage source for its respective motor winding to govern each amplifier of its respective pair to conduct and reset in mutual phase opposition with respect to each other, means connecting the output of each pair of magnetic amplifiers to its respective pair of gatable rectifiers to govern the conduction of each one of the pair in adjacent half cycles during the conducting half cycles of its respective amplifier, said magnetic amplifiers each having a reset voltage of sufficient magnitude to produce no output during conduction half cycles, means to apply an A.C. voltage in phase with one of the control windings and in phase quadrature with the main phase winding to subtract from the normal magnitude of the reset voltage of the magnetic amplifiers for the main phase winding during a portion of each reset cycle and to subtract from the reset voltage of the magnetic amplifiers for one control winding during each complete reset cycle and to add to the reset voltage of the magnetic amplifiers for the other control winding during each complete reset cycle to produce an output to gate the rectifiers during each conduction cycle for the main phase winding and said one control winding only, and means to vary the magnitude of the control voltage to govern the time for gating the respective rectifiers during each conduction cycle to control the average current to the motor windings.

2. In a system according to claim 1 wherein the means to apply the A.C. control voltage during each reset cycle is a transistor amplifier having its emitter and collector terminal output connected in parallel to the magnetic amplifiers for the main phase winding and one magnetic amplifier of each pair for the control windings, and a reference voltage connected to the input of the transistor amplifier in phase with one of the control windings.

3. In a control system for operating from a three terminal source of a three phase power supply, a two phase alternating current motor having a main phase winding and two opposed control phase windings with means for deriving from said supply a main phase voltage and a control phase voltage in relative phase quadrature, said motor windings each being fed from the power supply through a respective pair of gatable rectifiers, each said pair of rectifiers being connected in anti-parallel relation to provide a full wave A.C. voltage, the combination of a magnetic amplifier for gating each of the rectifiers, each said magnetic amplifier including a synchronizing transformer portion and a saturable transformer portion, each synchronizing portion having an input winding and an output winding, each saturable portion having a primary circuit and a secondary circuit, means connecting the input winding of a first pair of the magnetic amplifiers to one phase of the supply and the secondary circuit across the gate and cathode terminals of the rectifiers for the main phase winding, means connecting the input windings of a second pair of magnetic amplifiers to another phase of the supply and the secondary circuit across the gate and cathode terminals of rectifiers for controlling the control phase winding, means connecting the input of a winding of a third pair of magnetic amplifiers to the other phase of the supply and the secondary circuit across the gate and cathode terminals of the rectifier connected to the other control winding, a transistor amplifier, means connecting the input of the amplifier to the phase of the voltage source for the control winding to provide an A.C. voltage output in phase quadrature to the main phase winding, means connecting the output of said transistor amplifier to each primary circuit of the main phase winding saturable transformer and the primary circuit of a magnetic amplifier for each of the control phase windings in parallel, said magnetic amplifiers being operative to provide no output to their secondary circuits in the absence of a voltage from the output of the transistor amplifier, and means to vary the magnitude and polarity of the output from the transistor amplifier to oppose the reset voltage to the main phase winding magnetic amplifiers during a portion of the reset cycle, and selectively to oppose the reset voltage of the magnetic amplifiers for the one and the other control winding magnetic amplifier during the entire reset cycle, to govern the direction and speed of the motor.

4. In a system according to claim 3 wherein the turns ratio of the primary and secondary circuits of the first pair of magnetic amplifiers is different than the turns ratio of the primary and secondary circuits of the second and third pair of magnetic amplifiers to render the output of the first pair of magnetic amplifiers more sensitive to the control A.C. voltage received for the portion of each reset cycle.

5. A method of controlling the speed and direction of rotation of a two phase alternating current motor connected to a three terminal source of a three phase power wherein said control has a main phase winding and two opposed control phase windings with means for deriving from said power source a main phase voltage and a control phase voltage in relative phase quadrature, and wherein said motor windings are each fed from the power source through a respective pair of gatable rectifiers that are connected in anti-parallel relation to control the conduction of current to its respective motor winding during each half cycle of A.C. voltage and wherein a resettable magnetic amplifier is connected to the supply source and the gating terminals of the rectifiers to synchronize the conductive periods of each rectifier and to govern the time during alternate half cycles for gating its respective rectifier and wherein each magnetic amplifier normally provides no output in the absence of a voltage to decrease the reset voltage during reset cycles, comprising applying a single phase control voltage to increase the reset voltage in one of the control windings and simultaneously to decrease the reset voltage of the other control winding, simultaneously applying said control voltage to the main phase winding 90 degrees out of phase with the reset voltage of the magnetic amplifiers of the main phase winding, and varying the magnitude and polarity of said control voltage during each reset cycle to subtract from the reset voltage of the main phase winding during a portion only of each reset cycle and to selectively add and subtract from the reset voltage of both control phase windings during complete reset cycles thereof.

References Cited in the file of this patent

UNITED STATES PATENTS 2,960,644     Momberg et al. _____ Nov. 15, 1960